(12) United States Patent
Huber et al.

(10) Patent No.: US 10,518,330 B2
(45) Date of Patent: *Dec. 31, 2019

(54) DIRECT FORMATION OF METAL NANOPARTICLES USING ULTRASOUND

(71) Applicant: National Technology & Engineering Solutions of Sandia, LLC, Albuquerque, NM (US)

(72) Inventors: Dale L. Huber, Albuquerque, NM (US); John Daniel Watt, Albuquerque, NM (US); Jonathan Chavez, Grovetown, GA (US); Lauren Marie Ammerman, Albuquerque, NM (US)

(73) Assignee: National Technology & Engineering Solutions of Sandia, LLC, Albuquerque, NM (US)

(*) Notice: Subject to any disclaimer, the term of this patent is extended or adjusted under 35 U.S.C. 154(b) by 0 days.

This patent is subject to a terminal disclaimer.

(21) Appl. No.: 16/219,482

(22) Filed: Dec. 13, 2018

(65) Prior Publication Data

US 2019/0126354 A1    May 2, 2019

Related U.S. Application Data

(63) Continuation-in-part of application No. 15/484,856, filed on Apr. 11, 2017.

(Continued)

(51) Int. Cl.
| | |
|---|---|
| *B22F 9/04* | (2006.01) |
| *B22F 9/16* | (2006.01) |
| *B22F 1/00* | (2006.01) |
| *B22F 9/20* | (2006.01) |
| *B82Y 40/00* | (2011.01) |

(Continued)

(52) U.S. Cl.
CPC .............. *B22F 9/04* (2013.01); *B22F 1/0018* (2013.01); *B22F 1/0044* (2013.01); *B22F 9/16* (2013.01); *B22F 9/20* (2013.01); *B22F 2009/001* (2013.01); *B22F 2301/255* (2013.01);

(Continued)

(58) Field of Classification Search
None
See application file for complete search history.

(56) References Cited

U.S. PATENT DOCUMENTS 3,717,481 A  *  2/1973  Short ..................... C22B 11/04
                                                                106/1.26

OTHER PUBLICATIONS

Liu et al., Size-Controlled Synthesis of Gold Nanoparticles from Bulk Gold Substrates by Sonoelectrochemical Methods, Sep. 15, 2004, J. Phys. Chem. B 2004, 108, p. 19237-19240 (Year: 2004).*

(Continued)

*Primary Examiner* — Keith Walker
*Assistant Examiner* — Adil A. Siddiqui
(74) *Attorney, Agent, or Firm* — Kevin W. Bieg (57) ABSTRACT

A method for creating nanoparticles directly from bulk metal by applying ultrasound to the surface in the presence of a two-part surfactant system. Implosive collapse of cavitation bubbles near the bulk metal surface generates powerful microjets, leading to material ejection. This liberated material is captured and stabilized by a surfactant bilayer in the form of nanoparticles. Nanoparticles can be produced regardless of the bulk metal form factor. The method is generally applicable of metals and alloys. The method can be applied to an environmentally important problem, the reclamation of gold from an electronic waste stream.

19 Claims, 11 Drawing Sheets

Related U.S. Application Data (60) Provisional application No. 62/321,415, filed on Apr. 12, 2016.

(51) Int. Cl.
*B22F 9/00* (2006.01)
*B82Y 30/00* (2011.01)

(52) U.S. Cl.
CPC ..... *B22F 2304/054* (2013.01); *B22F 2999/00* (2013.01); *B82Y 30/00* (2013.01); *B82Y 40/00* (2013.01)

(56) References Cited

OTHER PUBLICATIONS

Dai et al., "Rapid formation of high-quality self-assembled monolayers of dodecanethiol on polycrystalline gold under ultrasonic irradiation", Jan. 22, 2008, Electrochimica Acta 53 (2008), p. 3479-3483 (Year: 2008).*
Prasad et al., "Digestive-Ripening Agents for Gold Nanoparticles: Alternatives to Thiols", 2003, Chem. Mater. 2003, 15, p. 935-942 (Year: 2003).*
Hongal et al. "A Technical Method of Extraction of Gold From E-Waste: A Multi-Sensor Based Method Using Microcontroller", May 2014, IJRET: International Journal of Research in Engineering and Technology, p. 94-97 (Year: 2014).*
Uson et al. "Continuous microfluidic synthesis and functionalization of gold nanorods", Oct. 9, 2015, Chemical Engineering Journal 285, p. 286-292 (Year: 2015).*
Suslick, K. S. et al., "Inside a Collapsing Bubble: Sonoluminescence and the Conditions During Cavitation", Annu. Rev. Phys. Chem., 2008, pp. 659-683, vol. 59.
Suslick, K. S. et al., "Applications of Ultrasound to Materials Chemistry", Annu. Rev. Mater, Sci., 1999, pp. 295-326, vol. 29.
Xu, H. et al., "Sonochemical Synthesis of Nanomaterials", Chem. Soc. Rev., 2013, pp. 2555-2567, vol. 42.
Gedanken, A., "Using Sonochemistry for the Fabrication of Nanomaterials", Ultrasonics Sonochemistry, 2004, pp. 47-55, vol. 11.
Li, Z. et al., "A Facile Way for Preparing Tin Nanoparticles from Bulk Tin Via Ultrasound Dispersion", Ultrasonics Sonochemistry, 2007, pp. 89-92, vol. 14.
Friedman, H. et al., "Micro- and Nano-Spheres of Low Melting Point Metals and Alloys, Formed by Ultrasonic Cavitation", Ultrasonics Sonochemistry, 2013, pp. 432-444, vol. 20.
Han, Z. H. et al., "Synthesis of Low-Melting-Point Metallic Nanoparticles with an Ultrasonic Nanoemulsion Method", Ultrasonics, 2011, pp. 485-488, vol. 51.
Maisonhaute, E. et al., "Surface Acoustic Cavitation Understood Via Nanosecond Electrochemistry. Part III: Shear Stress in Ultrasonic Cleaning", Ultrasonics Sonochemistry, 2002, pp. 297-303, vol. 9.
Pereira, F. et al., "Measurement and Modeling of Propeller Caviation in Uniform Inflow", Journal of Fluids Engineering, 2004, pp. 671-679, vol. 126.
Manikandan, M. et al., "Sonophysical Cost Effective Rapid Indigenous Preparation of Aluminium Particles via Exfoliation of Aluminium Foil", RSC Advances, 2016, pp. 32405-32413, vol. 6.
Verhaagen, B. et al., "Measuring Cavitation and Its Cleaning Effect", Ultrasonics Sonochemistry, 2016, pp. 619-628, vol. 29.
Dai, J. et al., "Rapid Formation of High-Quality Self-Assembled Monolayers of Dodecanethiol on Polycrystalline Gold Under Ultrasonic Irradiation", Electrochimica Acta, 2008, pp. 3479-3483, vol. 53.
Radziuk, D.V. et al., "Ultrasonic Alloying of Preformed Gold and Silver Nanoparticles", Small, 2010, pp. 545-553, vol. 6.
Prozorov, T. et al., "High Velocity Interparticle Collisions Driven by Ultrasound", Journal of American Chemical Society, 2004, pp. 13890-13891, vol. 126.
Doktycz, S.J. and Suslick, K.D., "Interparticle Collisions Driven by Ultrasound", Science, 1990, pp. 1067-1069, vol. 247.
Sun, V.I. et al., "The Role of Surface Free Energy on the Formation of Hybrid Bilayer Membranes", Journal of American Chemical Society, 2002, pp. 14676-16783, vol. 124.
Silvestri, A. et al., "Gold Nanoparticles Obtained by Aqueous Digestive Ripening: Their Application as X-ray Contrast Agents", Journal of Collid and Interface Science, 2015, pp. 28-33, vol. 439.
Prasad, B.L.V. et al., "Digestive Ripening of Thiolated Gold Nanoparticles: The Effect of Alkyl Chain Length", Langmuir, 2002, pp. 7515-7520, vol. 18.
Dular, M. et al., "Observations of Cavitation Erosion Pit Formation", Ultrasonics Sonochemistry, 2013, pp. 1113-1120, vol. 20.

* cited by examiner

DIRECT FORMATION OF METAL NANOPARTICLES USING ULTRASOUND

CROSS-REFERENCE TO RELATED APPLICATIONS

This application is a continuation-in-part of application Ser. No. 15/484,856, filed Apr. 11, 2017, which claims the benefit of U.S. Provisional Application No. 62/321,415, filed Apr. 12, 2016, both of which are incorporated herein by reference.

STATEMENT OF GOVERNMENT INTEREST

This invention was made with Government support under Contract No. DE-NA0003525 awarded by the United States Department of Energy/National Nuclear Security Administration. The Government has certain rights in the invention.

FIELD OF THE INVENTION

The present invention relates to the formation of metal nanoparticles and, in particular, to the direct formation of metal nanoparticles from bulk metal sources through the application of ultrasound.

BACKGROUND OF THE INVENTION

Standard chemical approaches to metal nanoparticle synthesis are energy intensive and generate significant quantities of hazardous waste, making nanoparticles much more expensive than the metals from which they are formed. Development of mechanical methods that produce metal nanoparticles directly from bulk material would bypass high energy and potentially toxic chemical intermediates and allow for maximum atom efficiency. High-energy milling and cryomilling can produce metal nanoparticles from micro-particles, however the nanomaterials often suffer from poor crystallinity, incorporation of impurities, and a lack of size and shape uniformity. See N. Kumar et al., *RSC Advances* 6, 111380 (2016). More success has been achieved by passing metals through the gas phase; for example, direct evaporation of metals onto a surface can create very small quantities of nanoparticles. Larger amounts can be produced by constantly refreshing a surface or evaporating the metal under a liquid, as in laser ablation. See A. De Bonis et al., *J. Phys. D: Appl. Phys.* 46, 445301 (2013); and S. Stoeva et al., *J. Am. Chem. Soc.* 124, 2305 (2002). So, while these few methods do exist for the mechanical formation of metal nanoparticles, they are typically energy intensive, difficult to control, and challenging to scale up.

SUMMARY OF THE INVENTION

The present invention is directed to a method to produce metal nanoparticles directly from bulk metal, eliminating the need for the toxic dissolution and reduction steps. According to the invention, metal nanoparticle formation occurs when bulk metal is subjected to ultrasonication in a solution comprising a self-assembled monolayer-forming surfactant and an emulsion-form ing surfactant. Ultrasound drives the formation and implosive collapse of cavitation bubbles which impinge violently on the metal surface, liberating nanostructures which are stabilized in the solution by an organic bilayer. These nanoparticles can then be isolated and digestively ripened to give a solution of uniform nanoparticles. The method can use many different bulk metal sources.

The method can find applications in research, forming nanoparticles from metals and alloys that are otherwise difficult to form. The method is particularly useful in forming alloys in which the precursors possess different reactivities, which leads to inhomogeneously formed alloy nanoparticles. This method can be used to strip the vast majority of gold from electronic waste and directly form nanoparticles. Due to its atom efficiency, the direct ultrasonic method can be used in greener nanoparticles syntheses. For example, gold nanoparticles can be made from native gold metal upon recovery from mining. Using industrial scale flow-through ultrasonication cells with control over the homogeneity of the ultrasonic field, the method is scalable to larger production amounts.

BRIEF DESCRIPTION OF THE DRAWINGS

The detailed description will refer to the following drawings, wherein like elements are referred to by like numbers.

FIG. 1 is a schematic illustration of cavitation bubble collapse leading to pit formation and material ejection. When bulk metal is subjected to ultrasonication in the presence of a self-assembled monolayer (SAM)-forming surfactant and an emulsion-forming surfactant in a solvent, an organic bilayer forms on the metal surface. This allows material that is ejected due to cavitation erosion to be stabilized as nanoparticles in solution.

DETAILED DESCRIPTION OF THE INVENTION

According to the present invention, metal nanoparticles can be produced in significant quantities directly from either bulk or larger particulate materials under a range of ultrasonication conditions. The mechanism does not involve a continuous decrease in size, but jumps directly from micron or larger size to the nanoscale. The process likely involves a microjet forming near the metal surface that ablates material from the surface, some of which forms metal nanoparticles. By providing an appropriate surfactant in the immediate vicinity of the ablation, the metal nanoparticles can be protected from agglomeration and collected.

The invention uses a mechanical method to prepare metallic nanoparticles directly from bulk sources using a standard ultrasonic horn. When ultrasound is applied to a liquid medium, it can drive the nucleation, growth and implosive collapse of cavitation bubbles. See K. S. Suslick and G. J. Price, *Annu. Rev. Mater. Sci.* 29, 295 (1999). Cavitation bubble collapse events yield extremely high local temperatures and pressures and can produce destructive microjets of liquid near surfaces. The collapse of cavitation bubbles is a major source of degradation in naval propulsion systems, and are well known to cause the destruction of aluminum foil in an ultrasonic bath. See F. Pereira et al., *J. Fluid Eng. T. Asme.* 126, 671 (2004); B. Verhaagen and D. F. Rivas, *Ultrason. Sonochem.* 29, 619 (2016); and T. J. Mason and D. Peters, *Practical Sonochemistry*, 2nd Edition ed., Woodhead Publishing (2002). Ultrasound has previously been exploited to form nanoparticles from metal salt solutions and molten metals and has been shown to systematically reduce particle size from the bulk. See Z. Li et al., *Ultrason. Sonochem.* 14, 89 (2007); H. Friedman et al., *Ultrason. Sonochem.* 20, 432 (2013); Z. H. Han et al., *Ultrasonics* 51, 485 (2011); A. Gedanken, *Ultrason. Sonochem.* 11, 47 (2004); and D. V. Radziuk et al., *Small* 6, 545 (2010). However, it has been conclusively demonstrated that the systematic reduction in particle size ceases before achieving nanoparticulates due to a fundamental limit in generating strong enough forces to fracture sub-micron particles. See T. Prozorov et al., *J. Am. Chem. Soc.* 126, 13890 (2004); and S. Doktycz and K. Suslick, *Science* 247, 1067 (1990). The method of the present invention sidesteps this limitation by producing nanoparticles directly from the bulk, without passing through micron and sub-micron sized particles. The material ejected from a bulk metal surface experiencing the destructive force of cavitation bubble collapse can be captured directly in the form of nanoparticles.

The invention uses a simple and general method to capture this ejected material in the form of nanoparticles by employing a dual surfactant system. A self-assembled monolayer (SAM)-forming surfactant and an emulsion-forming surfactant are added to solvent along with bulk metal. The solvent can be a polar solvent, such as water. The SAM coats the metal surface, allowing ejected material to be stabilized as nanoparticles, while the emulsion-forming surfactant creates the top leaf of a bilayer to provide solubility in the solvent. The emulsion-form ing surfactant serves a second role in solubilizing a reservoir of SAM-forming surfactant in solution, transporting it to refresh the bulk surface coating, as well as the newly formed nanoparticles.

As an example of the invention, gold was selected as an exemplary model system as it is one of the most extensively studied nanoparticle species with great potential in theranostics, photothermal therapy, and sensor technologies. See J. Qin et al., *Nanoscale* 7, 13991 (2015); A. J. McGrath et al., *ACS Nano* (2015); R. Bardhan et al., *Acc. Chem. Res.* 44, 936 (2011); and L. J. Xue et al., *Small* 13 (2017). Furthermore, nanostructured gold possesses well-defined surface plasmon resonances (SPRs), or strong molecular-like transitions in the UV, which are sensitive to changes in nanoparticle size, shape and crystallinity, enabling rapid spectroscopic investigation into material transformations. See J. Watt et al., *Chem. Mater.* 27, 6442 (2015); P. K. Jain et al., *J. Phys. Chem. B* 110, 7238 (2006); and M. M. Alvarez et al., *J. Phys. Chem. B* 101, 3706 (1997). However, the ultrasonication method of the present invention is broadly applicable to the formation of nanoparticles directly from bulk sources of other metals, including transition metals, such as Ni, and coinage metals, such as Ag and AuAg alloy.

Formation of Nanoparticles Directly from Bulk Metal Sources

Figure 1:
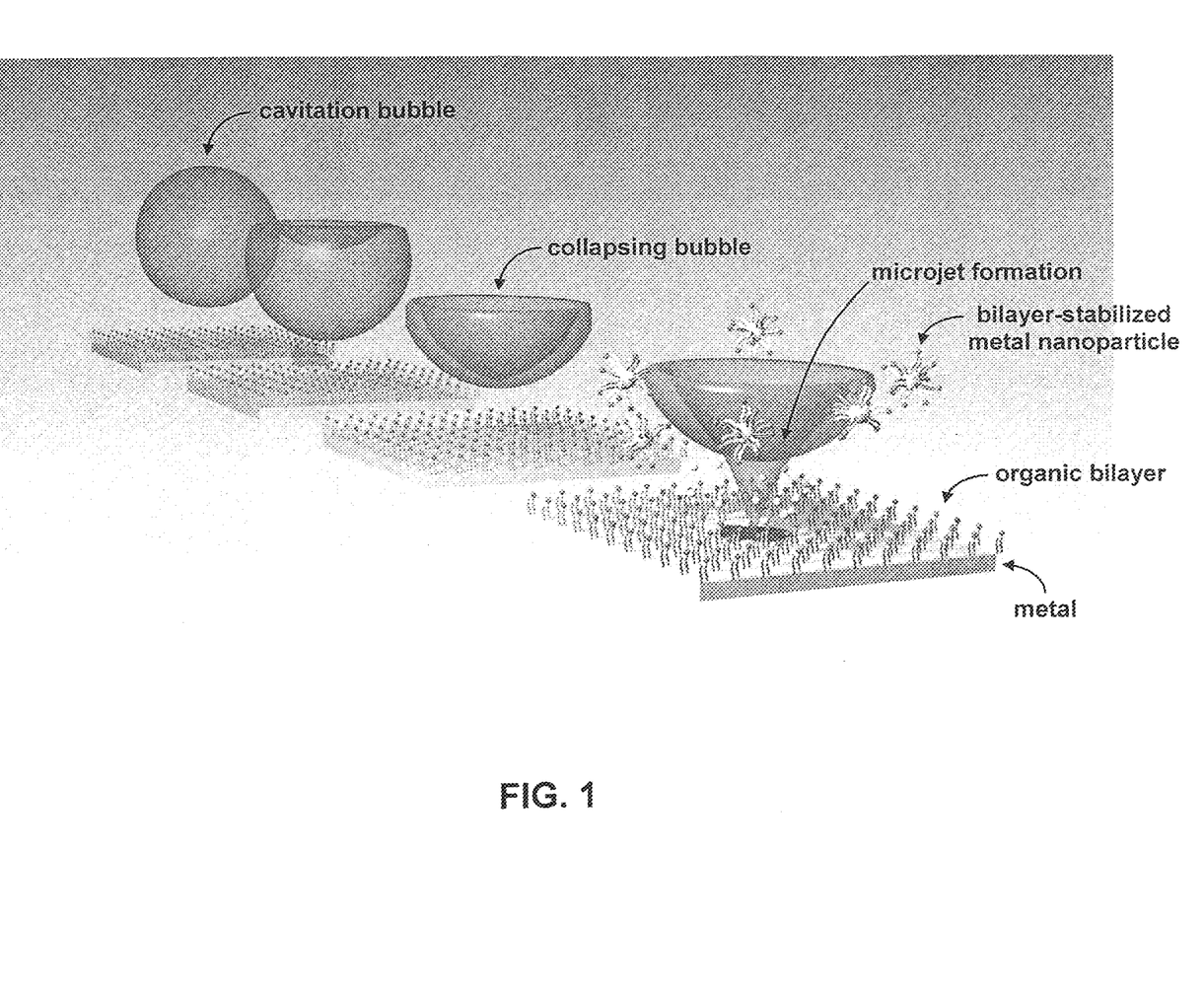

FIG. 1 shows a schematic representation of cavitation bubble collapse leading to pit formation and material ejection. The figure schematically depicts how simple organic additives can lead to the formation of nanostructures from bulk metal under ultrasonication. In this example, the metal surface is first modified by a self-assembled monolayer (SAM) of a SAM-forming surfactant, such as a straight-chained alkyl thiol. See H. Dai et al., *Electrochim. Acta* 53, 3479 (2008). Then, with an emulsion-forming surfactant, such as a quaternary ammonium salt, present in solution, an organic bilayer forms. See V. I. Silin et al., *J. Am. Chem. Soc.* 124, 14676 (2002). Ultrasound is applied to the solution, driving the nucleation of a cavitation bubble above the surface. It is well established that if the surface is significantly larger than the cavitation bubble, uniform bubble collapse no longer occurs in close proximity of the surface. Instead, there is an asymmetric collapse, which generates a high velocity (~100 ms$^{-1}$) micro-jet of liquid to the surface, leading to powerful shockwaves, material ejection, pitting and cavitation erosion. See K. S. Suslick and G. J. Price, *Annu. Rev. Mater. Sci.* 29, 295 (1999); and E. Maisonhaute et al., *Ultrason. Sonochem.* 9, 297 (2002). The liberated material takes the form of nanostructures, which are stabilized in solution by an organic bilayer.

Figure 2A:
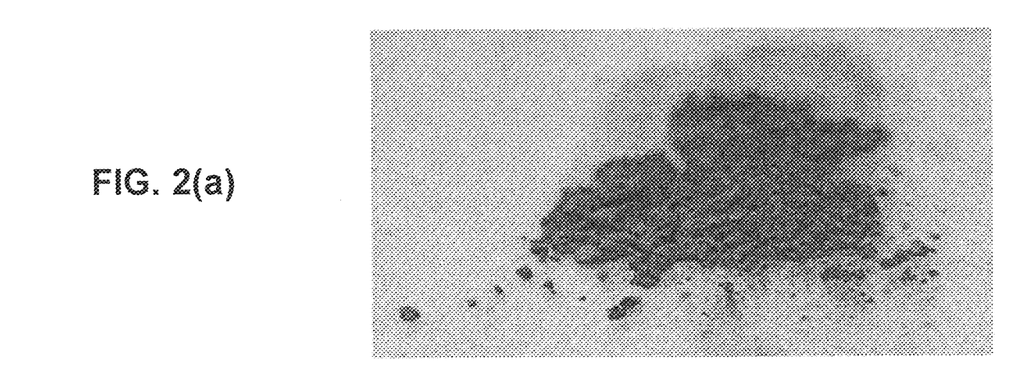
FIG. 2(a) is a photograph of bulk gold in the form of a powder.
Figure 2B:
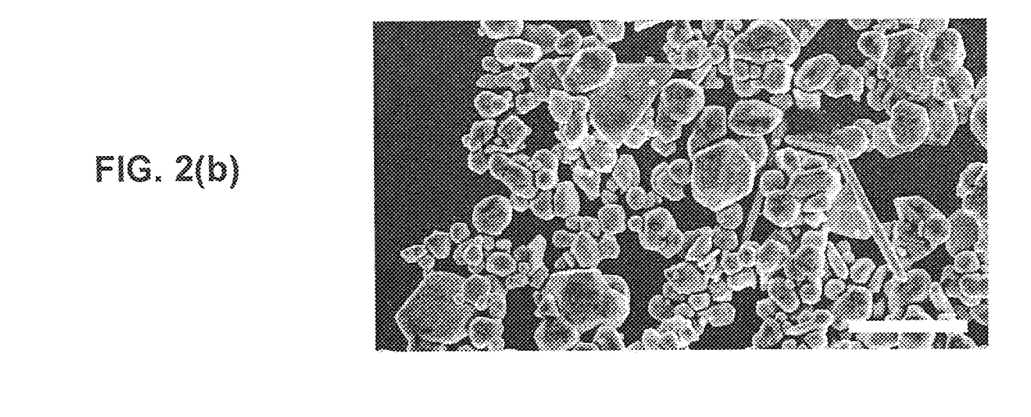
FIG. 2(b) is a scanning electron micrograph (SEM) of the powder, consisting of hexagonal and plate-like particles. Scale bar=5 µm.

The bulk gold source subjected to ultrasonication in this example was a commercial gold powder, shown in FIG. 2(a). Scanning electron microscopy (SEM) revealed this powder to consist of hexagonal and plate-like particles 1.7±0.9 μm in size, as shown in FIG. 2(b). In a typical experiment, 100 mg (0.5 mmol) of the powder was added to 15 mL DI water along with 75 mg (0.37 mmol) dodecanethiol and 125 mg (0.27 mmol) didodecyldimethylammonium bromide (DDAB) in a conical shaped glass sonication vessel. The ultrasonication reaction setup consisted of a titanium ultrasonic horn 6.4 mm in diameter, the conical shaped reaction vessel, and a glass cooling jacket kept at 0° C. to increase the energy of bubble collapse. See T. J. Mason and D. Peters, *Practical Sonochemistry*, 2nd Edition ed., Woodhead Publishing (2002). Ultrasonication was performed at 18 W with a frequency of 20 kHz for up to 6 h.

Figure 3:
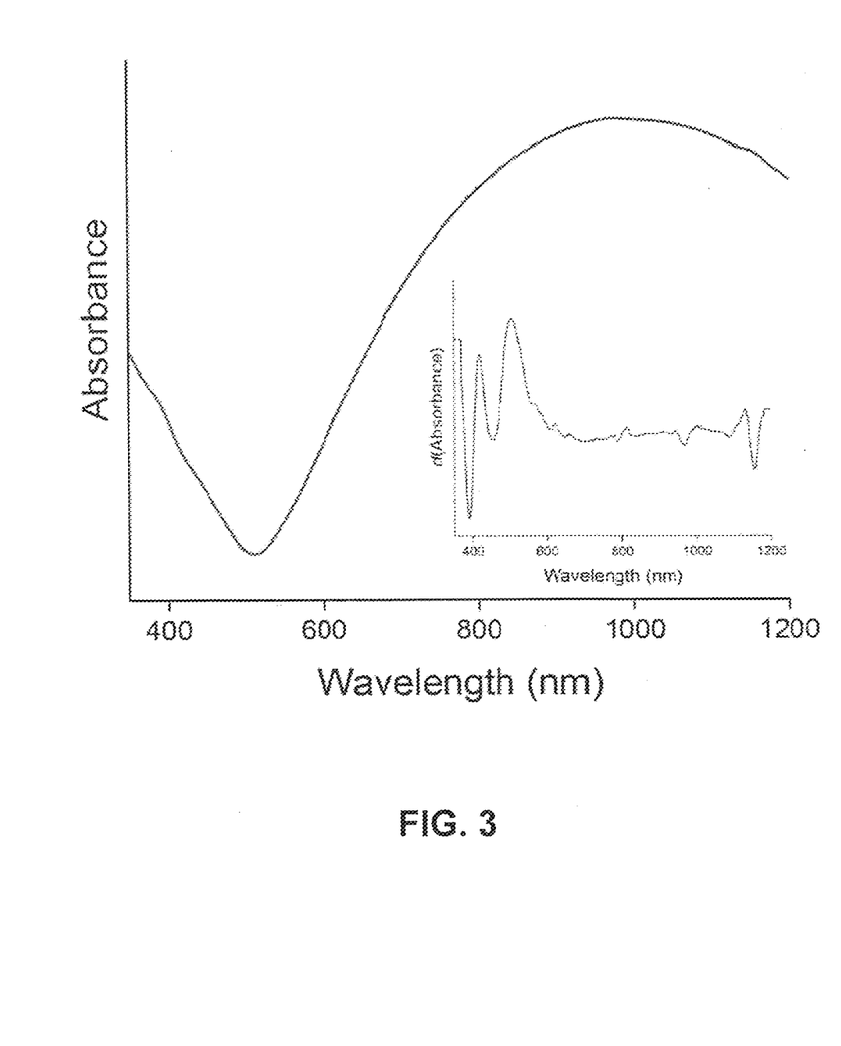
FIG. 3 is a UV-vis spectrum of the dark blue solution of finely divided gold resulting from the ultrasonication of the gold powder, along with differential absorption (inset).

The resulting solution had a dark blue color, characteristic of finely divided gold, which is a significant transformation from the unsonicated reaction solution. UV-vis analysis, shown in FIG. 3, showed a broad absorption beginning at 507 nm, stretching into the near infrared (NIR). The absorption stretching below 507 nm into the UV is attributed to scattering from excess DDAB micelles. When the derivative of the UV-vis spectrum is plotted (inset), two distinct absorptions are observed, located at 389 nm and 451 nm.

Figure 4A:
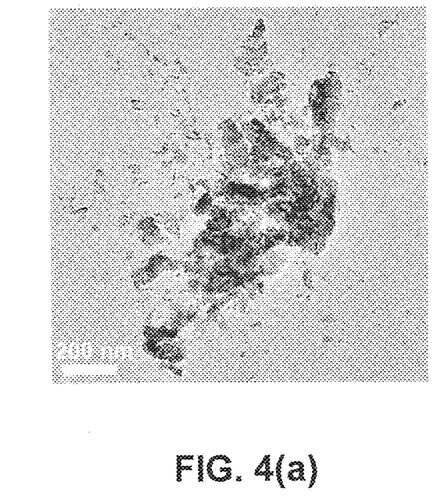
FIG. 4(a) is a transmission electron microscopy (TEM) image of micron-sized structures with ill-defined morphologies.
Figure 4B:
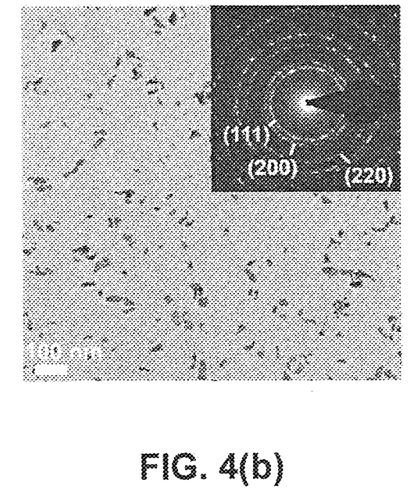
FIG. 4(b) is a TEM of gold spheroid and rod-like nanoparticles ranging in size from 5 nm to 100 nm. Selected area electron diffraction (inset) of the nanoparticles could be indexed to the face centered cubic (fcc) crystal structure.
Figure 4C:
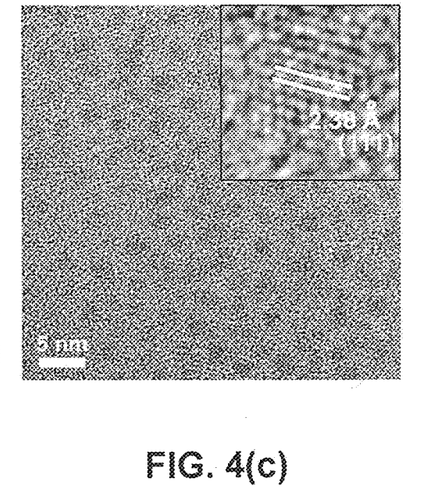
FIG. 4(c) is a high magnification TEM of a population of nanoparticles 2.0±0.3 nm in size, which can be indexed to fcc gold (inset).

Transmission electron microscopy (TEM) experiments were performed on the as-sonicated reaction product. As shown in FIG. 4(a), sub-micron sized structures with ill-defined morphologies were observed at low magnification. Energy dispersive X-ray spectroscopy (EDX) experiments were performed to ensure degradation of the titanium sonication horn did not result in contamination; indeed gold was the only metal present in solution. As shown in FIG. 4(b), spheroid and rod-like nanoparticles 5-100 nm in size were identified at increasing magnification. Selected area electron diffraction (SAED) could be indexed to the face centered cubic (fcc) crystal structure, characteristic of gold (FIG. 4(b), inset). Gold nanostructures above ~2 nm in size display a SPR that red-shifts with increasing particle diameter. See U. Kreibig and L. Genzel, *Surf. Sci.* 156, Part 2, 678 (1985). Therefore, this population of nanoparticles is responsible for the broad absorption stretching into the NIR shown in FIG. 3. At higher magnification, small, spherical nanoparticles 2.0±0.3 nm in size were observed, as shown in FIG. 4(c). High resolution TEM (inset) showed visible lattice planes which could be indexed to the (111) plane of fcc Au. TEM and scanning transmission electron microscopy (STEM) experiments revealed the small nanoparticles formed ribbon-like superstructures; which have previously been observed for similar sized dodecanethiol-coated nanoparticles. See Z. Wu et al., *ACS Nano* 9, 6315 (2015); and Z. Wu et al., *Angew. Chem. Int. Ed. Engl.* 53, 12196 (2014). For nanoparticles of this size (≤2.0 nm), optical absorption arises due to high energy molecular-like transitions, observed in FIG. 3, inset, as the absorption peaks at 389 nm and 451 nm. See M. M. Alvarez et al., *J. Phys. Chem. B* 101, 3706 (1997). In order to improve atom economy, the sub-micron sized particulate was recovered by centrifugation and added again to a mixture of dodecanethiol and DDAB in water. This was subjected to further ultrasonication and again led to nanostructured gold. By doing this, the bulk gold precursor can be continuously consumed and can reach a quantitative yield.

The roles of the two surfactants used in this exemplary system were investigated. Ultrasonication was performed on gold powder with no surfactant present (water only). No absorption peaks were observed in the corresponding UV-vis spectra after 6 h, indicating no nanostructures were formed. SEM characterization of the resulting gold surface showed visible surface rearrangement characteristic of melting, however, the average macroscopic particle size was unchanged. When either surfactant was used individually, the same result was observed and no nanoparticles were formed. To understand the role of the SAM-forming surfactant, dodecanethiol was substituted with either DL-dithiothreitol or 1,8-octanedithiol. DL-dithiothreitol does not form well packed monolayers due to the presence of bulky hydroxyl groups and dithiols are known to be much more sensitive to formation conditions. See C. Vericat et al., *Chem. Soc. Rev.* 39, 1805 (2010). Ellipsometry experiments were performed on Si wafers sputtered with Au that had been subjected to ultrasonication for 20 min under model reaction solutions. The gold surface sonicated with dodecanethiol had a thin film thickness of 1.6 nm, indicating a well-formed monolayer. See H. Dai et al., *Electrochim. Acta* 53, 3479 (2008). Measurements on DL-dithiothreitol and 1,8-octanedithiol showed thin film thicknesses of 0.4 nm and 0.1 nm, respectively, indicating that well-ordered monolayers were not formed. See C. Vericat et al., *Chem. Soc. Rev.* 39, 1805 (2010). When subjected to ultrasound along with DDAB, these alkyl thiol coatings generated solutions with very low absorbances, and hence low nanostructure yields, indicating the presence of a well-formed SAM/bilayer is critical to enhancing yield. In general, well-formed SAMs can be obtained with long straight chain alkyl thiols, such as dodecanethiol, 1-octanethiol, or 1-decanethiol, but not with branched-chain thiols or dithiols. Little effect was observed when changing quaternary ammonium surfactant, indicating its role is limited to bilayer formation and solubilization of dodecanethiol. A single water-soluble SAM-forming surfactant could possibly remove the need for an emulsion-forming surfactant, however attempts at forming nanoparticles using a water-soluble poly(ethylene glycol) methyl ether thiol (PEG-2000-SH), Tween 80, or sodium dodecyl sulfate (SDS) produced very poor yields of nanoparticles. The excellent water solubility of the surfactant may slow the rate at which this surfactant coats the newly formed gold surfaces in the reaction. Therefore, while the two-surfactant system may not be necessary, they provide the most rapid production of nanoparticles by a significant margin.

Figure 5:
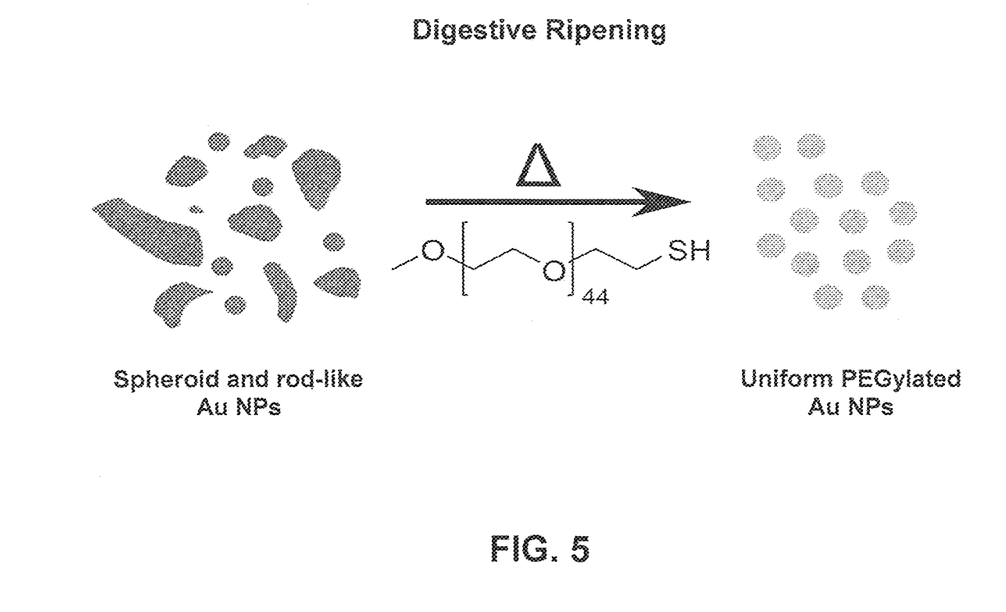
FIG. 5 is a schematic illustration of digestive ripening the as-sonicated gold nanostructures with poly(ethylene glycol) methyl ether thiol (PEG-2000-SH) in water.

For effective application of gold nanoparticles, a well-defined SPR is typically desired. To achieve this, a simple non-toxic digestive ripening step was employed, as shown in FIG. 5, that does not require harmful organic solvents. See A. Silvestri et al., *J. Colloid Interface Sci.* 439, 28 (2015); and B. L. V. Prasad et al., *Langmuir* 18, 7515 (2002). PEG-2000-SH was synthesized using an existing method. See K. Hojo et al., *Chem. Lett* 437 (1977). An aliquot of as-sonicated solution was refluxed in water in the presence of PEG-2000-SH followed by a size selection step. While PEG-2000-SH was relatively ineffective in producing nanoparticles, its good water solubility is ideal for aqueous digestive ripening. Due to its low vapor pressure, excess PEG-2000-SH could be easily recovered by rotary evaporation and recycled, increasing atom economy.

Figure 6A:
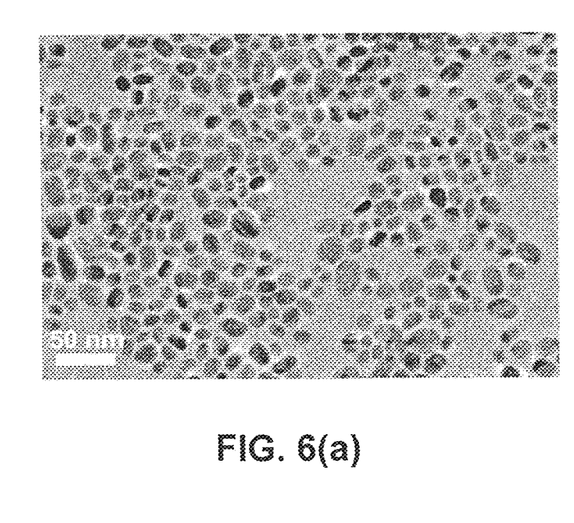
FIG. 6(a) is a TEM of the as-ripened gold nanoparticles.
Figure 6B:
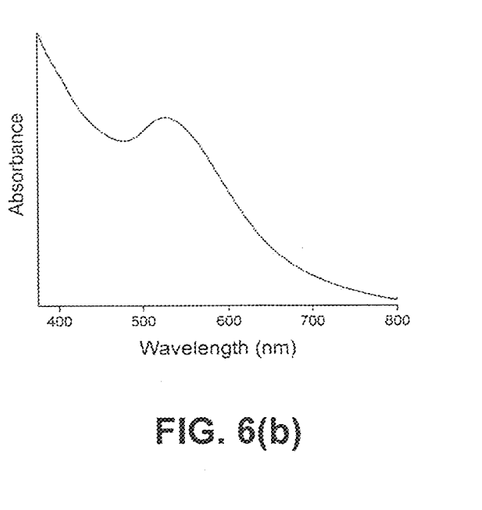
FIG. 6(b) is a UV-vis spectrum of the as-ripened gold nanoparticles showing a defined SPR centered at $\lambda_{max}$=530 nm.

TEM analysis showed the ripened nanoparticles to be spherical in shape and 12.7±3.1 nm in size, as shown in FIG. 6(a), indicating the dissolution of smaller (~2 nm) nanoparticles. UV-vis analysis showed a well-defined SPR centered at $\lambda_{max}$=530 nm, as shown in FIG. 6(b).

Figure 7A:
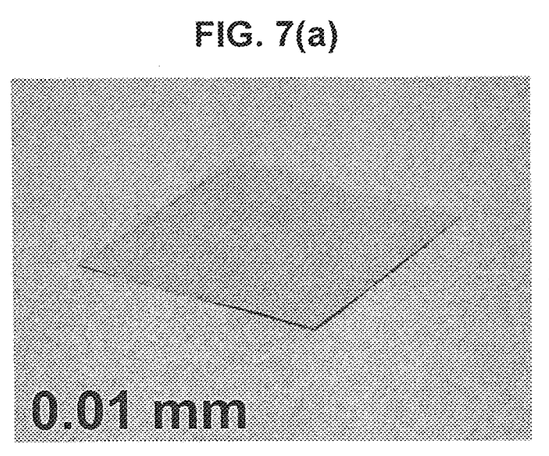
FIG. 7(a) is a photograph of a section of a 0.01 mm thick gold foil.
Figure 7B:
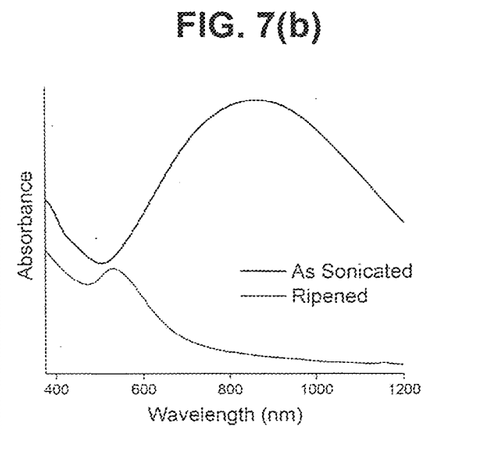
FIG. 7(b) is a UV-vis spectrum of nanoparticles resulting from ultrasonication of the 0.01 mm thick gold foil, displaying a SPR at $\lambda_{max}$=536 nm.
Figure 7C:
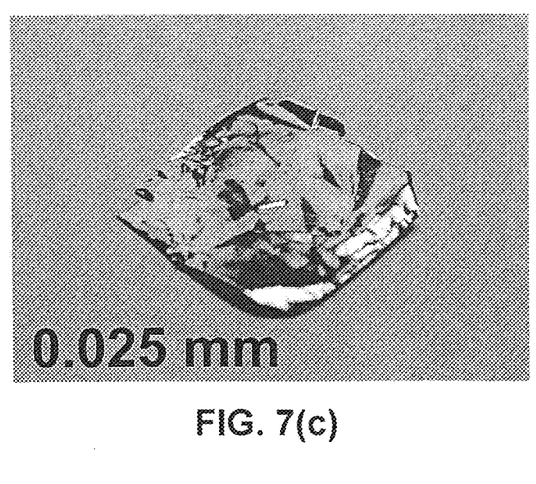
FIG. 7(c) is a photograph of a 0.025 mm thick gold foil.
Figure 7D:
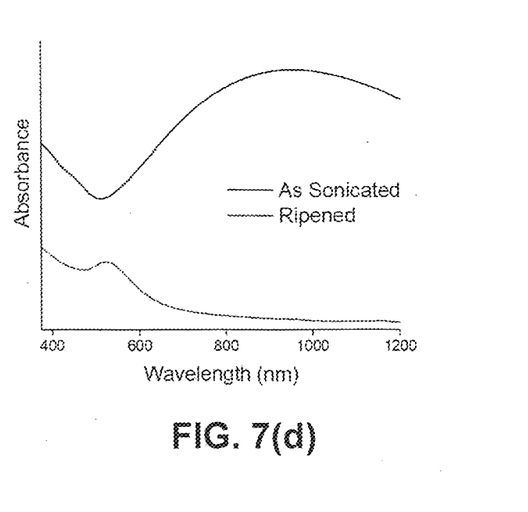
FIG. 7(d) is a UV-vis spectrum of nanoparticles resulting from ultrasonication of the 0.025 mm thick gold foil, displaying a SPR at $\lambda_{max}$=534 nm.

Different forms of bulk gold were subjected to ultrasonication to demonstrate the versatility of this approach. FIG. 7(a) shows a 0.01 mm thick gold foil. As shown in FIG. 7(b), ultrasonication of this gold foil produced an UV-vis spectrum closely resembling the optical profile shown in FIG. 3, indicating a similar size distribution of as-liberated gold nanostructures. Upon digestive ripening with PEG-2000-SH and size selection, a well-defined SPR was observed at $\lambda_{max}$=536 nm. TEM analysis revealed the nanoparticles were spherical and 14.2±4.1 nm in size. A similar result was observed with 0.025 mm thick gold foil, as shown in FIG. 7(c). Here, following a digestive ripening, a SPR emerged centered at $\lambda_{max}$=534 nm, as shown in FIG. 7(d). The nanoparticles were also spherical and 12.2±2.8 nm in size. UV-vis absorption intensity, and hence nanoparticle yield, was observed to decrease as foil thickness increased, for a given mass of foil. This confirms the hypothesis that nanostructure formation occurs from cavitation erosion and material ejection. A larger surface area increases the probability of a cavitation event impacting the surface, leading to an increase in the rate of nanoparticle formation. A second form of gold powder was also subjected to ultrasonication. SEM analysis revealed it to consist of spherical grains 1.1±0.6 µm in size, with a roughened surface. Gold nanostructures were also formed, confirming the versatility of the method; however, yield was significantly reduced. In this case, the curved surface dissipates the energy of the collapsing bubble, reducing the force of any potential impact. See T. J. Mason and D. Peters, *Practical Sonochemistry*, 2nd Edition ed., Woodhead Publishing (2002); and E. A. Neppiras, *Physics Reports* 61, 159 (1980). The method was then applied to Ag and AuAg alloy bulk sources. Nanoparticles were observed by TEM and EDX analysis following ultrasonication, confirming the wide applicability of the method to different coinage metals.

Figure 8A:
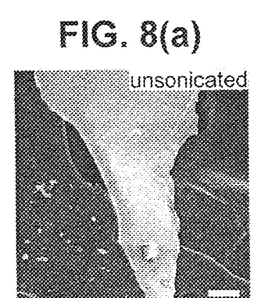
FIGS. 8(a)-(j) are SEMs at low and high magnification of 0.01 mm thick gold foil that has been subjected to ultrasonication for 0 min, 20 min, 2 h, 4 h, and 6 h. Scale bars show 50 µm and 10 µm for FIGS. 8(a)-(e) and 8(f)-(j), respectively.
Figure 8B:
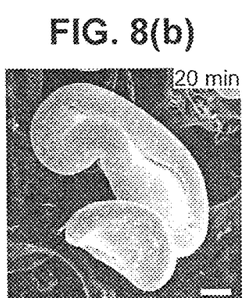
Figure 8C:
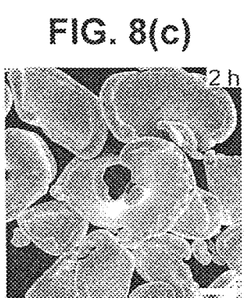
Figure 8D:
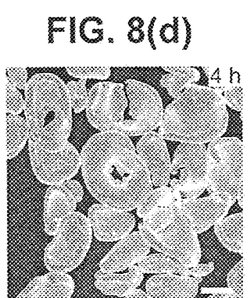
Figure 8E:
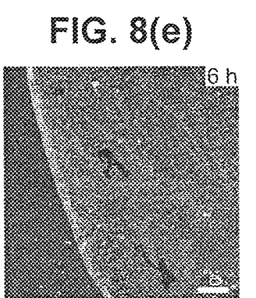
Figure 8F:
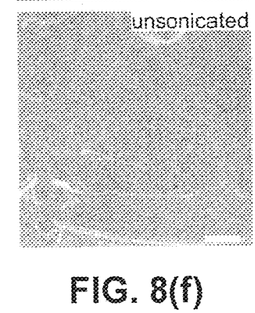
Figure 8G:
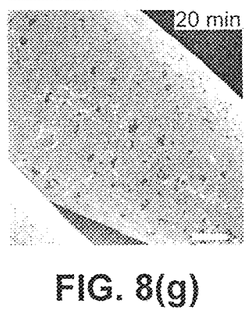
Figure 8H:
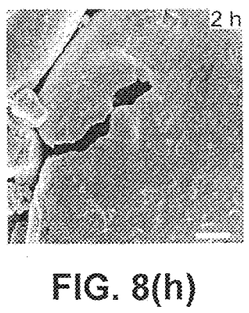
Figure 8I:
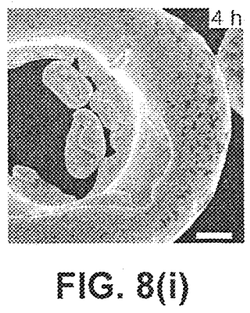
Figure 8J:
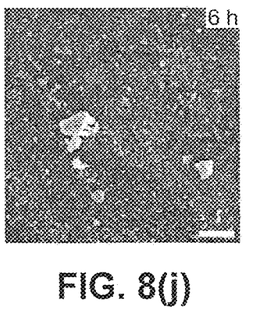

The effect that ultrasonication had on the bulk gold surface was investigated by performing time-dependent SEM experiments for 0 h (i.e., an unsonicated surface), 20 min, 2 h, 4 h, and 6 h. The degradation of gold powder was so vigorous that information was difficult to extract. However, the large planar surface of 0.01 mm thick gold foil was well suited to give insight. SEM images taken at low and high magnifications are shown in FIGS. 8(a)-(e) and 8(f)-(j), respectively. As shown in FIGS. 8(a) and 8(f), a smooth, undisturbed surface was observed at 0 h. As shown in FIGS. 8(b) and 8(g), a reduction in size and some reorganization of the foil edges was observed at 20 min; presumably due to melting. As shown in FIG. 8(g), isolated spots of contrast difference were observed, which can be attributed to the formation of pits caused by cavitation bubble collapse and microjetting. See M. Dular et al., *Ultrason. Sonochem.* 20, 1113 (2013). As shown in FIGS. 8(c) and 8(h), a further reduction in total particle size and a tear propagating towards the center of a piece of foil was observed at 2 hr. As shown in FIGS. 8(d) and 8(i), the number and size of the cavitation pits has significantly increased, with a certain number having coalesced, at 4 hr. Large holes at the center of the foil pieces were also observed, indicating the foil had been punctured. Finally, as shown in FIGS. 8(e) and 8(j), only small particulate and the disappearance of larger foil pieces was observed at 6 hr, indicating consumption of the bulk gold source. Analysis of the 0.025 mm thick foil showed similar effects, however the degree of pitting and tearing was noticeably less extensive at each time point.

Figure 9A:
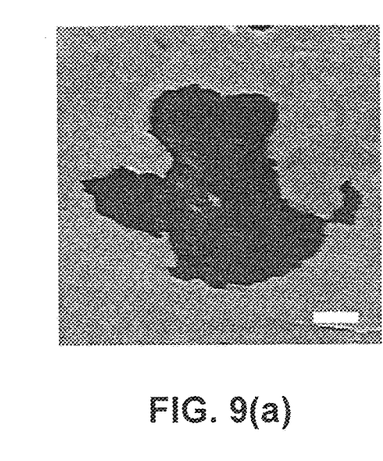
FIG. 9(a) is a secondary electron SEM image of a typical cavitation pit observed on the surface of 0.01 mm thick gold foil after ultrasonication for 20 min. Scale bar=1 µm.
Figure 9B:
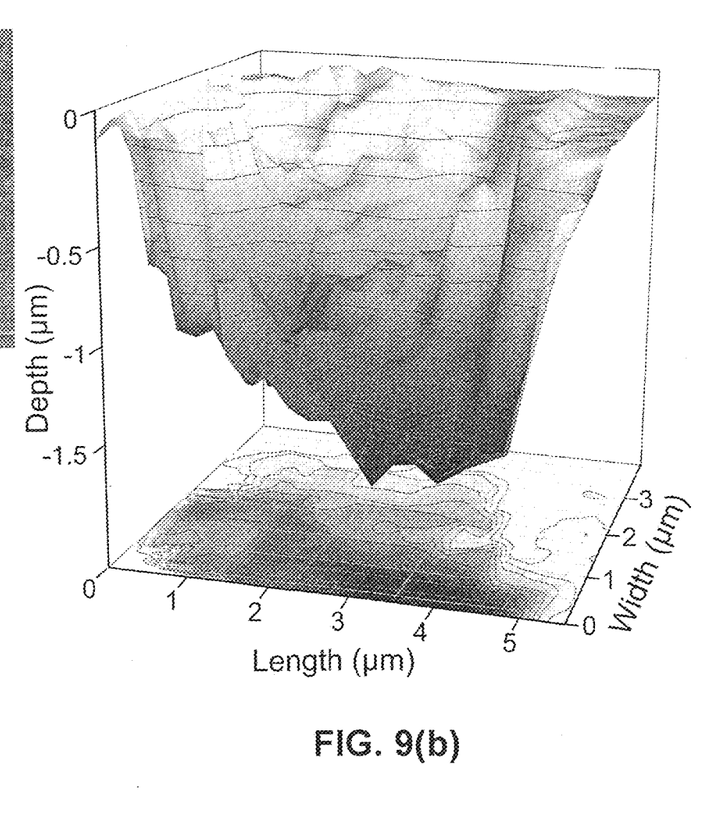
FIG. 9(b) is a 3D schematic representation of a typical cavitation pit reconstructed from 25 successive FIB slices 0.25 µm thick.

A single cavitation pit was fully characterized using focused ion beam (FIB) milling and SEM, as shown in FIGS. 9(a) and 9(b). The cavitation pit possesses an irregular shape, as shown in FIG. 9(a), which would suggest that successive bubble collapse events had contributed to pit formation, as has previously been observed on aluminum surfaces. See M. Dular et al., *Ultrason. Sonochem.* 20, 1113 (2013). To map the lower surface of the cavitation pit, it was first filled with Pt using ion beam induced platinum deposition; then 25 successive 0.25 µm thick slices were milled using a Ga$^+$ ion beam. These were individually imaged using SEM. The images were compiled to give an animation of the surface profile. The FIB slices were also reconstructed into a 3D schematic, shown in FIG. 9(b). The surface is non-uniform and possesses a roughness exceeding 0.5 µm in places, supporting the suggestion that pit formation can occur from multiple bubble collapse events.

Application to E-Waste Upcycling

Figure 10A:
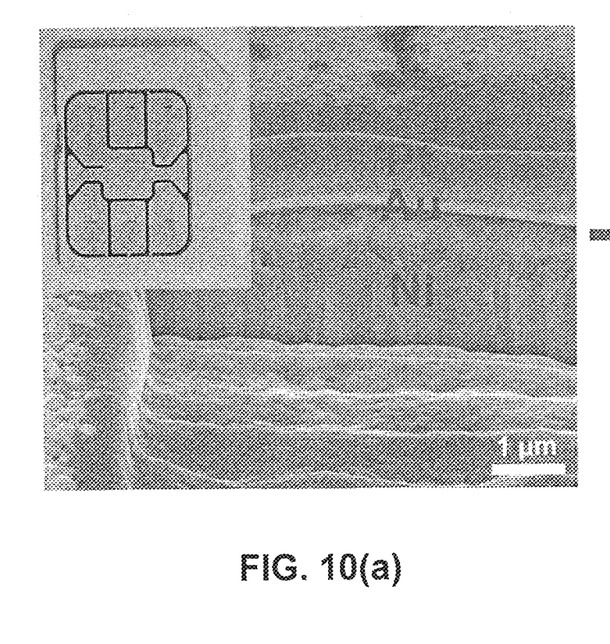
FIG. 10(a) is an SEM image of a focused ion beam milling (FIB) experiment revealed that the surface of the SIM card (inset) consisted of a thin Au layer supported on a Ni substrate. The Pt layer was deposited to protect the Au surface prior to FIB milling and was not present on the original card, nor was it present during sonication.
Figure 10B:
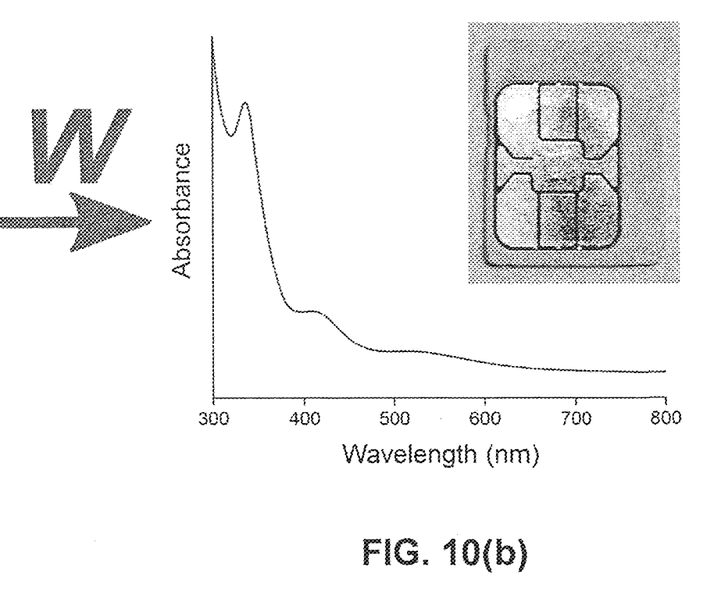
FIG. 10(b) is UV-vis spectrum of the resulting solution after ultrasonication of a SIM card in a mixture of water, DDAB, and dodecanethiol. Surface degradation of the SIM card is visible following ultrasonication (inset).

The ultrasonication method is applicable to a wide range of bulk metal sources, as long as there is a suitable surface to induce asymmetric cavitation bubble collapse. Therefore, the method can be applied to recycling precious metals from electronic waste. As an initial system, cellular subscriber identity module (SIM) cards were chosen, which possess a large planar surface of gold in the form of the electrical contact. The composition of a typical SIM card was first investigated using FIB milling, as shown in FIG. 10(a). A layer of platinum was deposited to protect the gold and the surface was etched to a depth of 2 µm. EDX spectroscopy revealed that the SIM card consisted of a uniform layer of gold 170 nm thick, in contact with a Ni underlayer. An unaltered SIM card complete with plastic support was placed in the sonication vessel along with DDAB and dodecanethiol, and sonicated for 6 h. Following ultrasonication, most of the gold contact surface on the SIM card was visibly degraded, as shown in FIG. 10(b), inset. SEM analysis revealed an eroded surface with the presence of cavitation pits. As the Au is near Ni, there was a high probability that some Ni nanoparticles were formed. Therefore, the as-sonicated reaction solution was placed in a magnetic field to isolate any liberated magnetic material. Indeed, TEM revealed the separated magnetic pellet contained Ni nanoparticles, indicating the method is broadly applicable to different transition metals. Following separation of Ni, any additional impurities were removed by performing a selective thiol-mediated organic phase transfer, resulting in a light pink colored solution characteristic of nanostructured gold. UV-vis spectroscopy showed a SPR centered at 532 nm along with two absorbance maxima at 336 nm and 416 nm, as shown in FIG. 10(b). The peaks were blue shifted when compared to previous, indicating a reduction in nanoparticle size. See U. Kreibig and L. Genzel, *Surf. Sci.* 156, Part 2, 678 (1985); and J. D. Ganière et al., *Solid State Commun.* 16, 113 (1975). TEM analysis revealed crystalline nanostructures up to 100 nm in size, as well as a population of smaller nanoparticles.

Figure 11A:
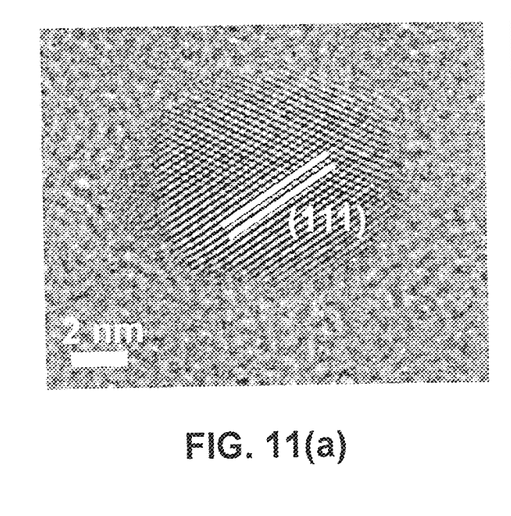
FIG. 11(a) shows a 10-nm nanoparticle indexed to fcc gold viewed down the <111> zone axis.
Figure 11B:
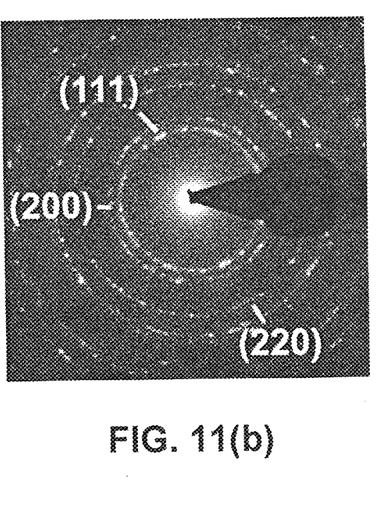
FIG. 11(b) is a SAED pattern of nanostructures liberated from the surface of a SIM card indexed to fcc gold.
Figure 11C:
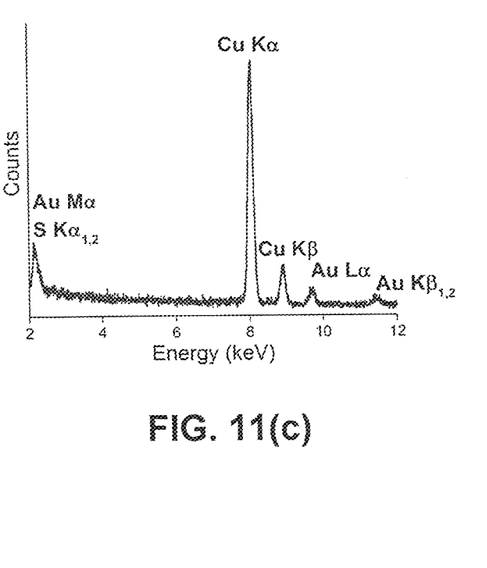
FIG. 11(c) is an EDX measurement showing that Au was the only metal present in solution (Cu signal is due to the TEM grid).

As shown in FIG. 11(a), a high magnification image of a gold nanoparticle 10 nm in size could be indexed to the fcc crystal structure view down the <111> zone axis. A SAED pattern was indexed to the fcc crystal structure, characteristic of gold, as shown in FIG. 11(b). EDX analysis showed that gold was the only metal present in solution, with the Cu signal originating from the TEM grid, as shown in FIG. 11(c).

The present invention has been described as a method for the direct formation of metal nanoparticles using ultrasound. It will be understood that the above description is merely illustrative of the applications of the principles of the present invention, the scope of which is to be determined by the claims viewed in light of the specification. Other variants and modifications of the invention will be apparent to those of skill in the art.

We claim:

1. A method of forming metal nanoparticles, comprising providing a bulk metal in a solution comprising a self-assembled monolayer-forming surfactant and an emulsion-forming surfactant that form an organic bilayer on a surface of the bulk metal in a solvent; and ultrasonicating the solution to form metal nanoparticles by implosive collapse of cavitation bubbles on the surface of the bulk metal and which are stabilized in the solution by the organic bilayer.

2. The method of claim 1, wherein the self-assembled monolayer-forming surfactant comprises a straight-chained alkyl thiol.

3. The method of claim 2, wherein the straight-chained alkyl thiol comprises dodecanethiol, 1-octanethiol, or 1-decanethiol.

4. The method of claim 1, wherein the emulsion-forming surfactant comprises a quaternary ammonium salt.

5. The method of claim 4, wherein the quaternary ammonium salt comprises didodecyldimethylammonium bromide, cetyltrimethylammonium bromide, or cetyltrimethylammonium chloride.

6. The method of claim 1, wherein the solvent comprises water.

7. The method of claim 1, wherein the ultrasonicating uses an ultrasound frequency between 20 kHz and 10 MHz.

8. The method of claim 1, wherein the metal nanoparticles are less than 100 nm in size.

9. The method of claim 1, further comprising digestive ripening of the metal nanoparticles.

10. The method of claim 9, wherein the digestive ripening comprises refluxing in water in the presence of a ripening agent.

11. The method of claim 10, wherein the ripening agent comprises poly(ethylene glycol) methyl ether thiol.

12. The method of claim 1, wherein the metal comprises a transition metal or alloys thereof.

13. The method of claim 12, wherein the transition metal comprises nickel.

14. The method of claim 12, wherein the transition metal comprises a coinage metal.

15. The method of claim 14, wherein the coinage metal comprises gold, silver, or gold-silver alloy.

16. The method of claim 1, wherein the bulk metal comprises metal powder.

17. The method of claim 16, wherein the size of the metal powder is less than 20 μm.

18. The method of claim 1, wherein the bulk metal comprises a gold contact.

19. The method of claim 18, wherein the gold contact comprises an electronic waste.

* * * * *